H. LUER.
MEAT CUTTING MACHINE.
APPLICATION FILED JULY 19, 1916.

1,239,926.

Patented Sept. 11, 1917.
3 SHEETS—SHEET 1.

Inventor
Herman Luer
By [signature], Atty.

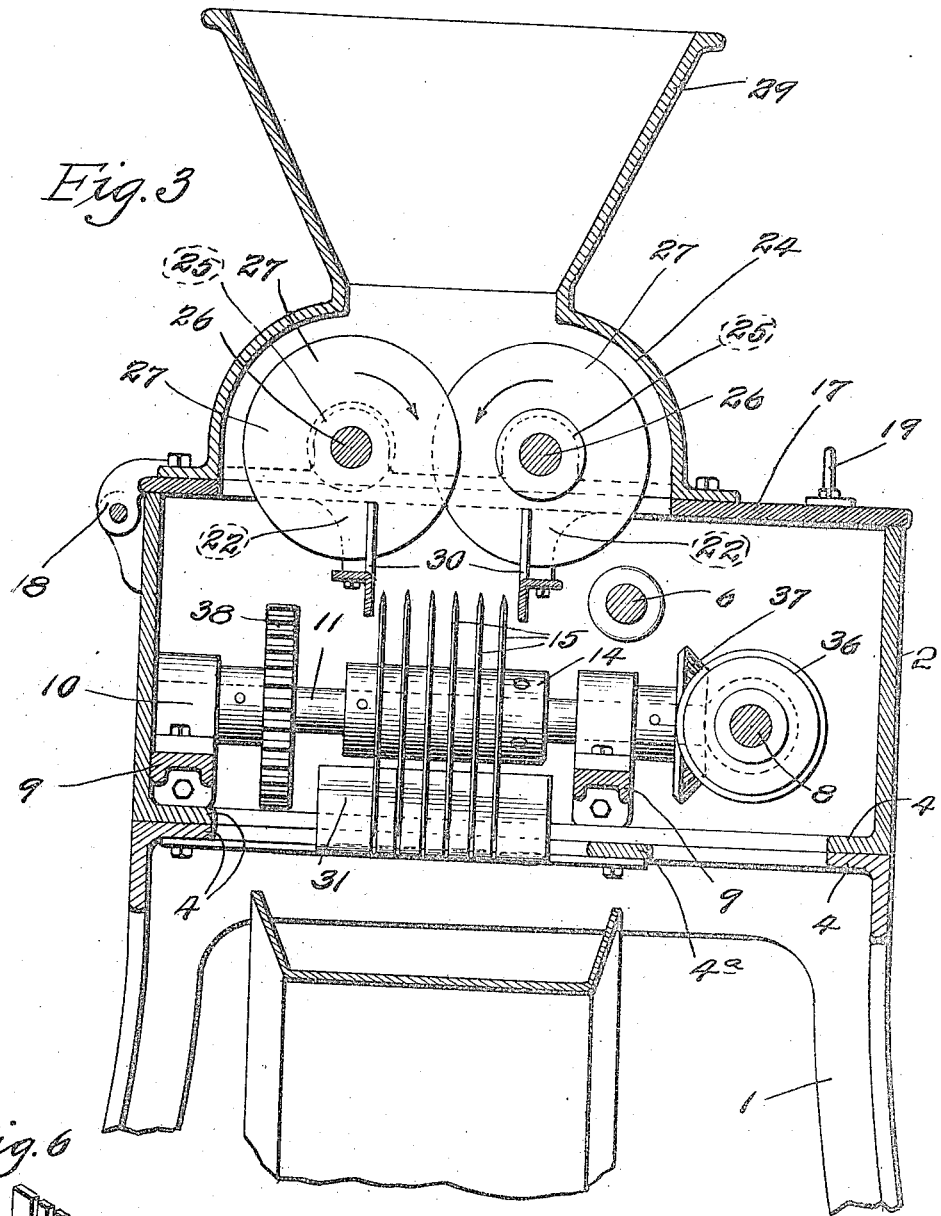
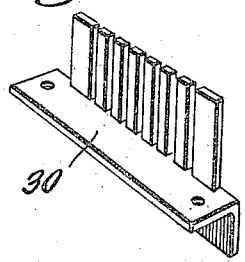

H. LUER.
MEAT CUTTING MACHINE.
APPLICATION FILED JULY 19, 1916.

1,239,926.

Patented Sept. 11, 1917.
3 SHEETS—SHEET 3.

Inventor
Herman Luer
By J. R. Cornwall Atty.

UNITED STATES PATENT OFFICE.

HERMAN LUER, OF ALTON, ILLINOIS.

MEAT-CUTTING MACHINE.

1,239,926.	Specification of Letters Patent.	Patented Sept. 11, 1917.

Application filed July 19, 1916. Serial No. 110,197.

*To all whom it may concern:*

Be it known that I, HERMAN LUER, a citizen of the United States, residing at the city of Alton, county of Madison, State of Illinois, have invented a certain new and useful Improvement in Meat-Cutting Machines, of which the following is a full, clear, and exact description, such as will enable others skilled in the art to which it appertains to make and use the same, reference being had to the accompanying drawings, forming part of this specification.

This invention relates to certain improvements in machines for cutting up meat incident to the manufacture of various products such as head cheese.

It is a growing requisite of packing houses that the most thorough sanitation and cleanliness be observed, from which circumstances arise the necessity of having all utensils and machinery employed of such nature and construction as to permit their being easily and thoroughly cleansed.

Accordingly, it is the principal purpose of my invention to provide a cutting machine which, in addition to insuring the cutting of meat into pieces of uniform section, shall be of such construction as to permit immediate and complete access to all of its parts for the purpose of permitting thorough and rapid cleansing.

A further object of my invention is to improve generally upon the construction of machines of this sort for the purpose of rendering them more simple and economical, and more positive and accurate in operation.

Other and further objects of my invention will be obvious or pointed out hereinafter, reference being had to the accompanying drawings, in which—

Fig. 3 is a sectional elevation;

Fig. 6 is a detail of one of the stripping plates.

Figure 1:
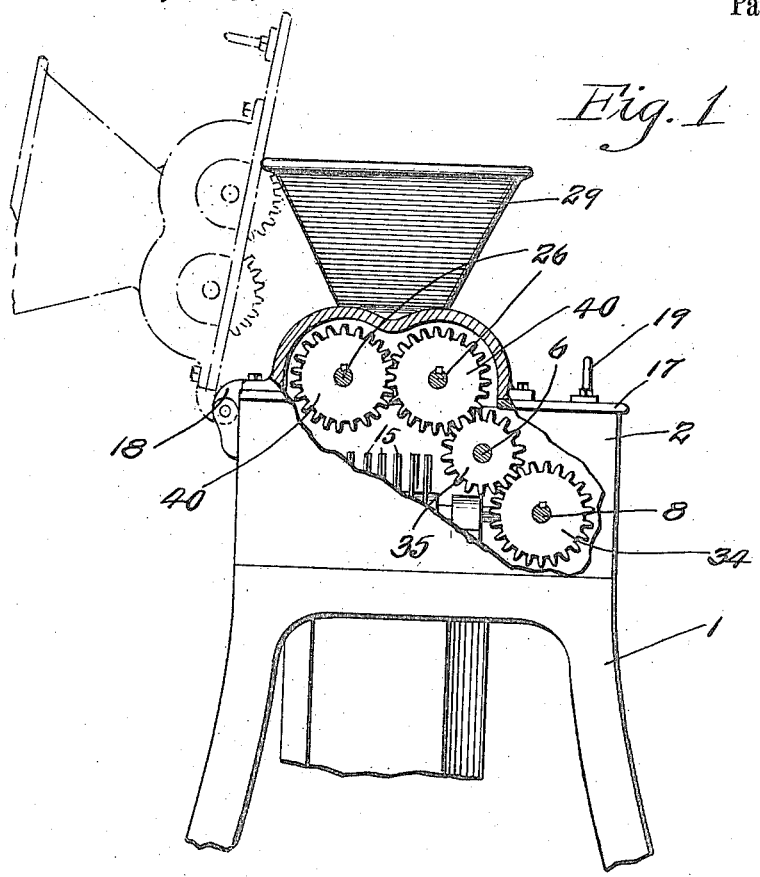
Figure 1 is a partial side elevation of my improved machine with parts broken away.
Figure 2:
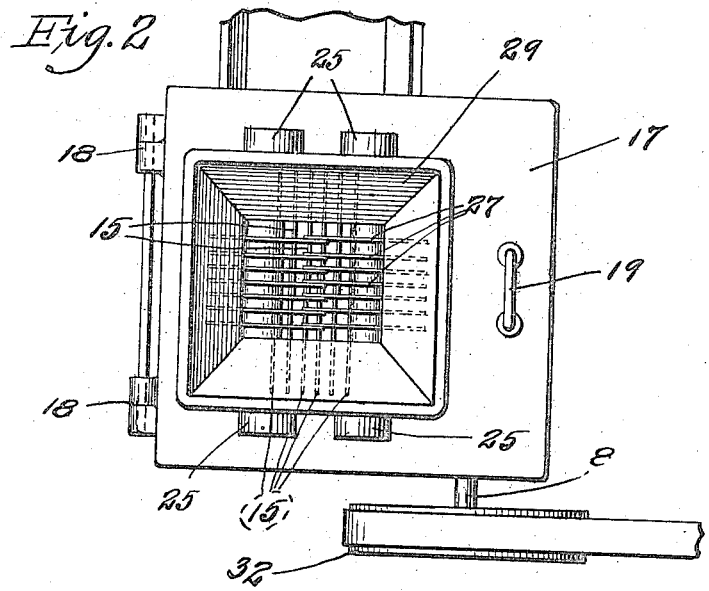
Fig. 2 is a plan.
Figure 4:
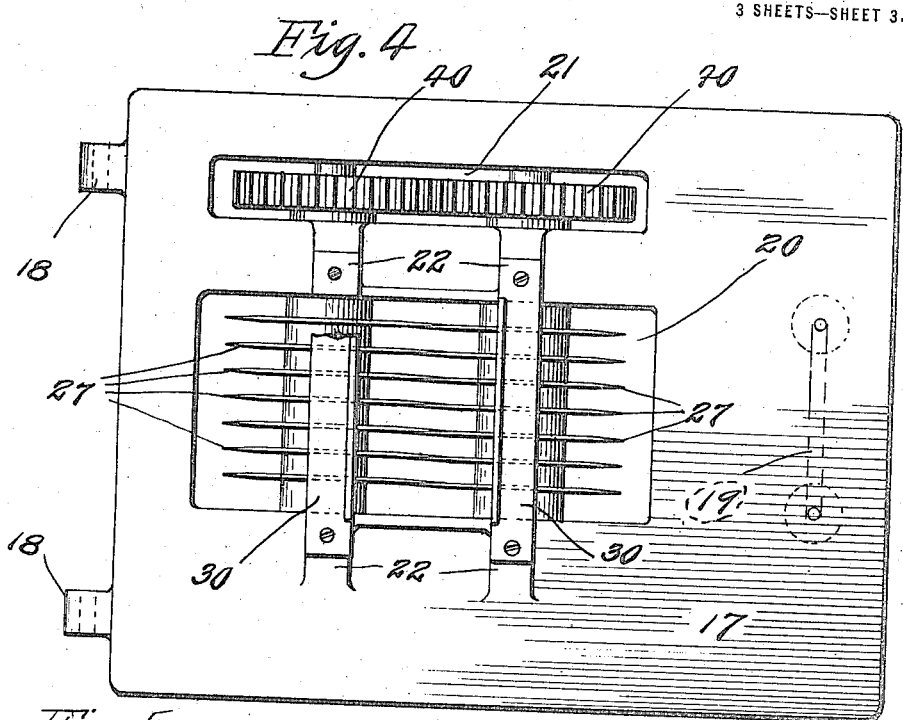
Fig. 4 is a bottom plan view of the cover plate with attached parts.
Figure 5:
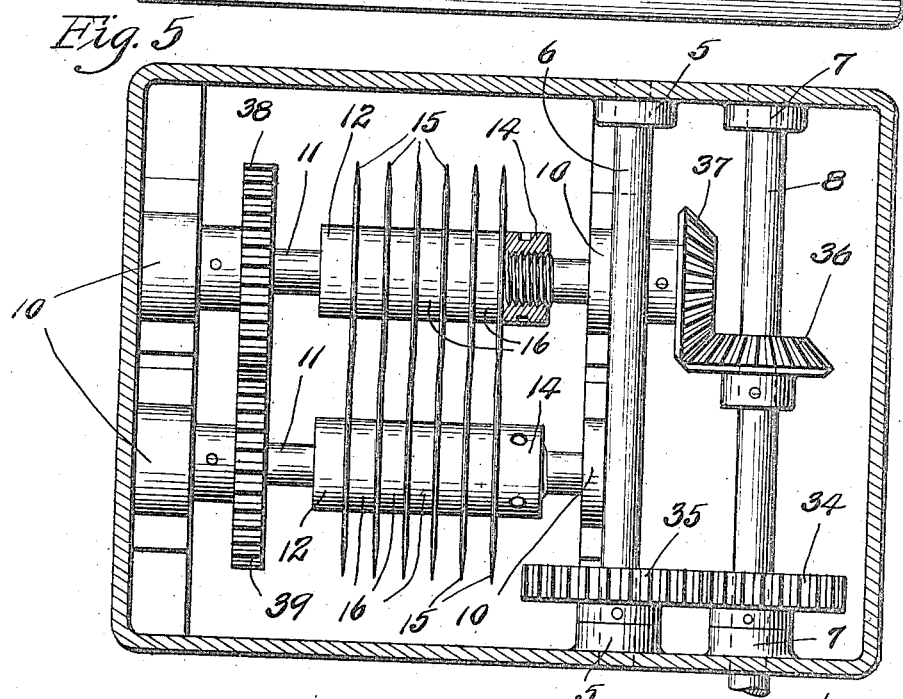
Fig. 5 is a plan view of the device with the cover removed, certain parts being shown in section.

In the preparation of meat for the manufacture of various cooked products, it is desirable that the meat be cut into pieces as uniform in size as possible in order to insure the uniform cooking of the pieces. Furthermore, in the manufacture of such products, efficiency demands a machine which is capable of rapid and continuous operation.

In the machine herein illustrated, I provide a suitable support in the form of the four-legged stand 1, upon which is mounted a four-walled housing 2. These parts may be of cast metal and are provided with inwardly projecting flanges 4 for the accommodation of the fastenings which secure them together. On opposite sides of the housing are formed bosses 5 which accommodate bearings in which a shaft 6 is journaled. Similar bosses 7 are arranged for the support of a second shaft 8 which extends parallel to shaft 6 somewhat below the same. Brackets 9 extending transversely of the housing are secured to opposite walls, form the supports for bearings 10 in which a pair of cutter shafts 11 are journaled. Upon each of these cutter shafts is mounted a fixed clamping collar 12 and a movable clamping collar 14. These collars are spaced apart, and intermediate them are disposed on the shaft circular cutters 15 which are spaced apart by and clamped between movable clamping disks 16. The pressure transmitted against the terminal one of the cutters 15 by operation of the movable clamping collar 14, clamps the cutters and disks 16 tightly together and against the fixed clamping collar 12, with the result that all of these parts are bound firmly for rotation with the shaft. However, they are immediately and readily releasable by the unscrewing of clamping collar 14, so as to permit their being separate from one another to facilitate cleaning.

The relative disposal of the shafts 11 and size of cutters 15 is such that the cutting edges of the latter overlap and make lateral contact adjacent their margins.

At its top the housing 2 is partially closed by a cover plate 17 which is secured to the casing by a hinge 18 at the front of the machine. Handle 19 is provided adjacent the opposite edge of the cover plate, to facilitate swinging the latter on the hinge. When swung to open position, the cover plate exposes all of the portions within the housing 2, thus facilitating access for cleansing. The cover portion is provided with a middle aperture 20 and a lateral aperture 21. At the opposite sides of the middle aperture 20 depend brackets 22. On top of the cover plate 17, and covering the apertures 20 and 21, is a cutter housing 24, which at its opposite ends is provided with bearings 25. In said bearings are mounted cutter shafts 26, which extend at right angles to the cutter shafts 11. Upon cutter shafts 26 are mounted cutters 27 whose construction and mounting are the same as the cutters 15.

The casing 24 has an aperture at its top over which is mounted a hopper 29. Upon the brackets 22 are mounted stripping plates 30, one of which is illustrated in Fig. 6, and which are slotted at proper intervals to accommodate the cutters 27. The fingers formed by the slots project up between the cutters and make contact with the lateral faces thereof. Similar stripping plates 31 are disposed below and in coöperative association with the lower cutters 15, said plates being supported on the flanges 4 and $4^a$ of the stand 1. The stripping plates 30 are disposed at right angles to the stripping plates 31, and extend downwardly to a point below the uppermost portions of the edges of the lower cutters 15.

The operation of the machine is accomplished as follows:

Suitable power is applied to shaft 8 by means of a pulley 32. Shaft 8 carries a spur pinion 34 which meshes with a similar spur pinion 35 on shaft 6. Shaft 8 also carries a bevel pinion 36 which meshes with bevel pinion 37 on one of the cutter shafts 11. This shaft in turn carries a spur pinion 38 which meshes with a similar spur pinion 39 carried on the companion cutter shaft 11. On the upper cutter shafts 26 are carried the intermeshing spur pinions 40, the rearward one of which meshes with the pinion 35 when the cover plate 17 is in closed position on the housing 2. Through these trains of transmission gearing, the lower cutter shafts 11 are rotated toward each other at a uniform speed, and the upper cutter shafts 26 are likewise rotated toward each other at a uniform speed. Meat fed into the hopper 29 will come first upon the margins of the upper cutters 27, whose rotation will carry the meat downwardly between the cutters while at the same time slicing it into pieces of uniform thickness. These pieces upon passing between the upper cutters 27 are brought into contact with the cutting margins of the lower cutters 15 which cut them at right angles to the original cuts, so as to form strips of uniform cross section. The stripping plates 30 operate to strip from the cutters any of the meat which adheres thereto, and to guide the meat intermediate the upper and lower cutters.

The cutters on the juxtaposed shafts are associated with each other in such fashion as to coöperate to give a shearing cut, and, being of very thin metal, they cut the meat clean without crushing or macerating any of it. The overlapping relationship of the blades also prevents bones from wedging between the edges of oppositely disposed cutters, a circumstance which would be likely to result in breakage of the cutters.

When it is desired to cleanse the machine, the cover plates 17 are simply swung to open position, in which position all of the gearing and both gangs of cutters are entirely exposed so that they may be thoroughly flushed and scalded. At the same time, ready access is permitted to the cutter mountings so as to permit the cutters to be separated from adjacent members and allow access of the cleansing fluid to all surfaces.

I am aware that machines employing gangs of rotary cutters have been employed heretofore in this art, but the construction of such machines has not been such as to facilitate the cleansing thereof. I am aware also that the device which I have herein illustrated and described is susceptible of various changes and modifications without departing from the scope and spirit of my invention as indicated in the following claim:

What I claim is:

In a cutting machine, the combination of a pair of shafts, means for rotating them, coöperating cutters carried on the shafts, a pair of upper shafts disposed above said first mentioned shafts, means for rotating the upper shafts, coöperating cutters carried by said upper shafts above the cutters on the lower shafts, stripping blades coöperating with the cutters on the upper shafts and on the lower shafts, and a hinged mounting for said upper shafts and said stripping blades whereby the latter may be swung out of coöperation with the cutters on the lower shafts.

In testimony whereof I hereunto affix my signature in the presence of two witnesses, this 11th day of July, 1916.

HERMAN LUER.

Witnesses:
O. H. KRAMER,
W. F. LOENKE.